(12) United States Patent
Mainini

(10) Patent No.: US 8,451,130 B2
(45) Date of Patent: May 28, 2013

(54) GESTURE-BASED ANIMAL TRAINER

(75) Inventor: Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 293 days.

(21) Appl. No.: 12/905,370

(22) Filed: Oct. 15, 2010

(65) Prior Publication Data

US 2012/0092170 A1 Apr. 19, 2012

(51) Int. Cl.
*G08B 23/00* (2006.01)
(52) U.S. Cl.
USPC ......... 340/573.3; 119/712; 119/719; 119/720
(58) Field of Classification Search
USPC ................. 340/573.1, 573.3, 384.2; 119/712, 119/719, 720
See application file for complete search history.

(56) References Cited

U.S. PATENT DOCUMENTS

| 6,160,478 | A  | * | 12/2000 | Jacobsen et al. | 340/539.12 |
| 6,895,305 | B2 |   | 5/2005  | Lathan et al.   |            |
| 2007/0109133 | A1 | * | 5/2007 | Kister et al.   | 340/573.1  |
| 2009/0295616 | A1 | * | 12/2009 | Martin         | 341/176    |
| 2010/0095896 | A1 | * | 4/2010 | Van Wye        | 119/57.92  |
| 2010/0117837 | A1 | * | 5/2010 | Stirling et al. | 340/573.1  |
| 2011/0298620 | A1 | * | 12/2011 | Zimmermann    | 340/573.1  |

* cited by examiner

*Primary Examiner* — Brent Swarthout
(74) *Attorney, Agent, or Firm* — Pitts & Lake, PC

(57) ABSTRACT

A gesture-based animal trainer is provided. The gesture-based animal trainer is configured to be used by a person that provides gesture commands to an animal. As used herein, the term "gesture commands" refers to gestures that are each associated with a respective animal training command, wherein a gesture is defined as a selected group of movements performed by a person. The gesture-based animal trainer detects whether the person performs a gesture command and provides a stimulus to the animal in accordance with the gesture command. Upon the animal associating the respective stimulus with the gesture command, the gesture-based animal trainer allows the animal to receive the gesture command regardless of whether the person is within the animal's line of sight.

15 Claims, 7 Drawing Sheets

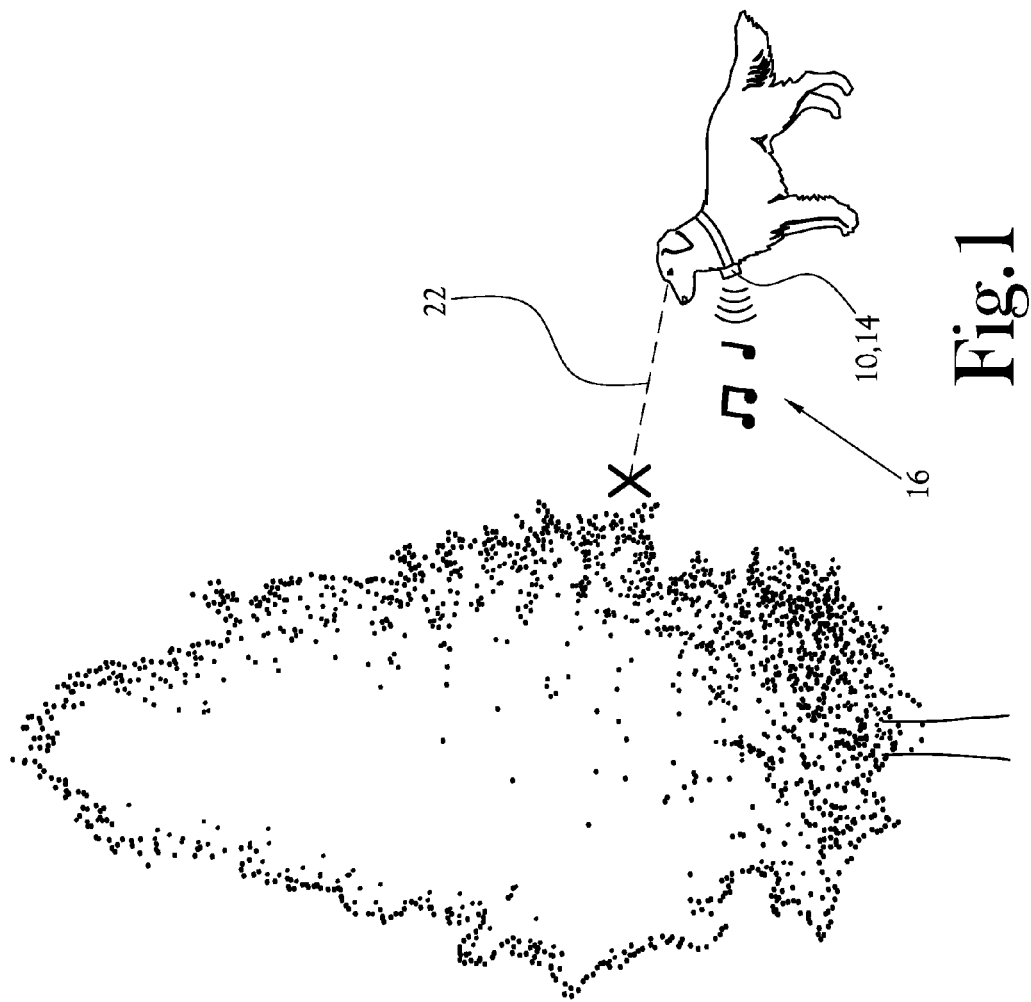
Fig.1
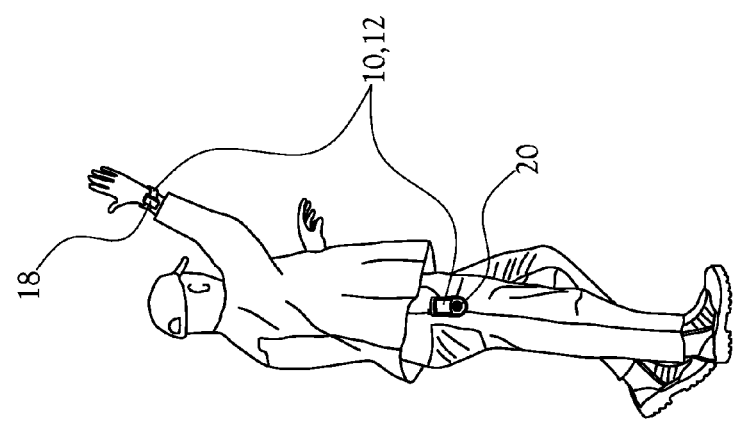

GESTURE-BASED ANIMAL TRAINER

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of the Invention

This invention relates to an animal training device. More specifically, this invention relates to an electronic animal training device for providing a stimulus to an animal.

2. Description of the Related Art

Animals, especially dogs, may be trained to be perceptive of a person's body language and movements. These animals are trained to associate a person's movements with a particular animal training command. Most of the training commands customarily used for animal training have corresponding movements that are established and distinct from the others. One shortcoming of this method of animal training is that the animal is required to have an unobstructed view of the person to observe the movement. In the event that the animal goes over a hill, around a corner, behind brush or trees, or is otherwise out of sight, the animal cannot receive the animal training commands.

BRIEF SUMMARY OF THE INVENTION

A gesture-based animal trainer is described herein and illustrated in the accompanying figures. The gesture-based animal trainer is configured to be used by a person that communicates with an animal through gesture commands. As used herein, the term "gesture command" refers to a gesture that is associated with a respective animal training cue, wherein a gesture is defined as a selected group of movements performed by a person. The gesture-based animal trainer includes a gesture unit utilized by the person and a receiver unit worn by the animal. The gesture unit is configured to detect the movements of the person used to perform a gesture command. These movements are communicated to the receiver unit and the receiver unit provides a respective stimulus to the animal, thereby notifying the animal when a particular gesture command has been requested. Simultaneously, the gesture command, if seen by the pet, is consistent with the training cue. Therefore if the dog sees the gesture, the behavior is executed the same as if he doesn't see the gesture.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is an illustration of one embodiment of a gesture-based animal trainer.

DETAILED DESCRIPTION OF THE INVENTION

Figure 2:
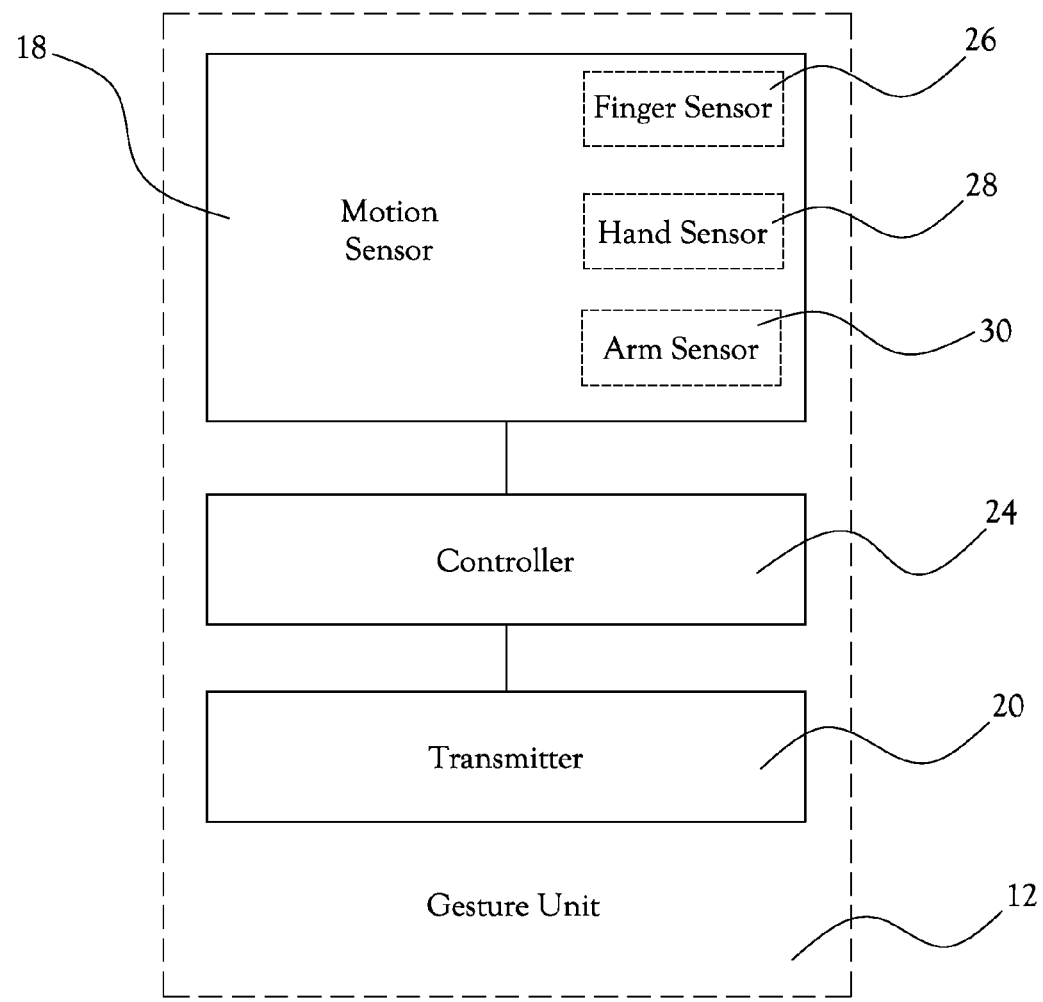
FIG. 2 is a block diagram of one embodiment of the gesture unit of the gesture-based animal trainer.

A gesture-based animal trainer is described in detail herein and illustrated in the accompanying figures. The gesture-based animal trainer is configured to be used by a person that communicates with an animal through gesture commands. As used herein, the term "gesture command" refers to a gesture that is associated with a respective animal training cue, wherein a gesture is defined as a selected group of movements performed by a person. The gesture-based animal trainer detects whether the person performs a gesture command and provides a stimulus to the animal in accordance therewith. Upon the animal associating the respective stimulus with the gesture command, the gesture-based animal trainer allows the person to communicate the gesture command to the animal regardless of whether the person is within the animal's line of sight.

FIG. 1 illustrates one embodiment of the gesture-based animal trainer 10 used by a person giving a gesture command to an animal, which is represented by a dog. The gesture-based animal trainer 10 includes a gesture unit 12 utilized by the person and a receiver unit 14 worn by the animal. The gesture unit 12 detects when the person performs gesture commands and generates a command signal for the respective gesture command. The gesture unit 12 communicates the command signal to the receiver unit 14. In response to receipt of the command signal, the receiver unit 14 provides a stimulus 16 to the animal in accordance with the respective gesture command.

More specifically, in the embodiment illustrated in FIG. 1, the gesture unit 12 includes a motion sensor 18 in communication with a transmitter 20. The motion sensor 18 detects movement of the person utilizing the gesture unit 12. For example, in the illustrated embodiment, the motion sensor 18 detects the person performing the selected group of movements defining the "stay" gesture. More specifically, the person performs the "stay" gesture command by extending their arm and open hand towards the animal such that the person's palm is directed towards the animal. In response to the person performing the "stay" gesture command, the gesture unit 12 generates a command signal for the "stay" gesture command. The gesture unit 12 utilizes the transmitter 20 to communicate the command signal to the receiver unit 14. Upon receipt of the command signal, the receiver unit 14 provides a stimulus 16 for the respective gesture command. For example, the receiver unit 14 in FIG. 1 provides an audible stimulus 16 in response to the person performing the "stay" gesture command such that the animal can recognize the stimulus 16 as the "stay" gesture command without observing 22 the person's movements.

FIG. 2 illustrates a block diagram of one embodiment of a gesture unit 12 for the gesture-based animal trainer 10. In the illustrated embodiment, the gesture unit 12 includes a controller 24 in communication with a motion sensor 18 and a transmitter 20. The controller 24 communicates with the motion sensor 18 and transmitter 20 such that the gesture unit 12 is able to translate a person's movements into a command signal and communicate the command signal to a receiver unit 14.

The motion sensor 18 is one or more sensors that detect movement of the person and generate sensor data therefore. The motion sensor 18 is able to detect fine movements, such as movements of the person's hands and fingers, and also major movements, such as movement of the person's arms and legs, as well as other parts of the body used to perform gesture commands. In the embodiment illustrated in FIG. 2, the motion sensor 18 includes, but is not limited to, finger sensors 26, hand sensors 28, and arm sensors 30 which detect movements for performing gesture commands. These motion sensors 18 are configured to detect movement of the body part to which the motion sensor 18 is secured. For example, in the embodiment illustrated in FIG. 1, the motion sensor 18 is secured to an arm of the person for detection of the person's arm movements. One suitable selection for the FIG. 1 motion sensor 18 is a three-axis gyroscope configured to sense changes in orientation along the yaw axis, pitch axis, and roll axis thereby allowing the motion sensor 18 to detect the movement of the person's arm. In another embodiment, the motion sensor 18 includes a plurality of accelerometers that collectively contribute to the motion sensor 18 detecting the movement of the person. Specifically, the accelerometers are able to detect magnitude and direction of any acceleration of the person's arms such that a vector can be calculated for the person's movement. Furthermore, alternate embodiments of motion sensor 18 can be realized through a plurality of other hardware implementations, e.g., a tilt sensor or a switch, that detect the person's movement without departing from the spirit and scope of the present invention.

Figure 3:
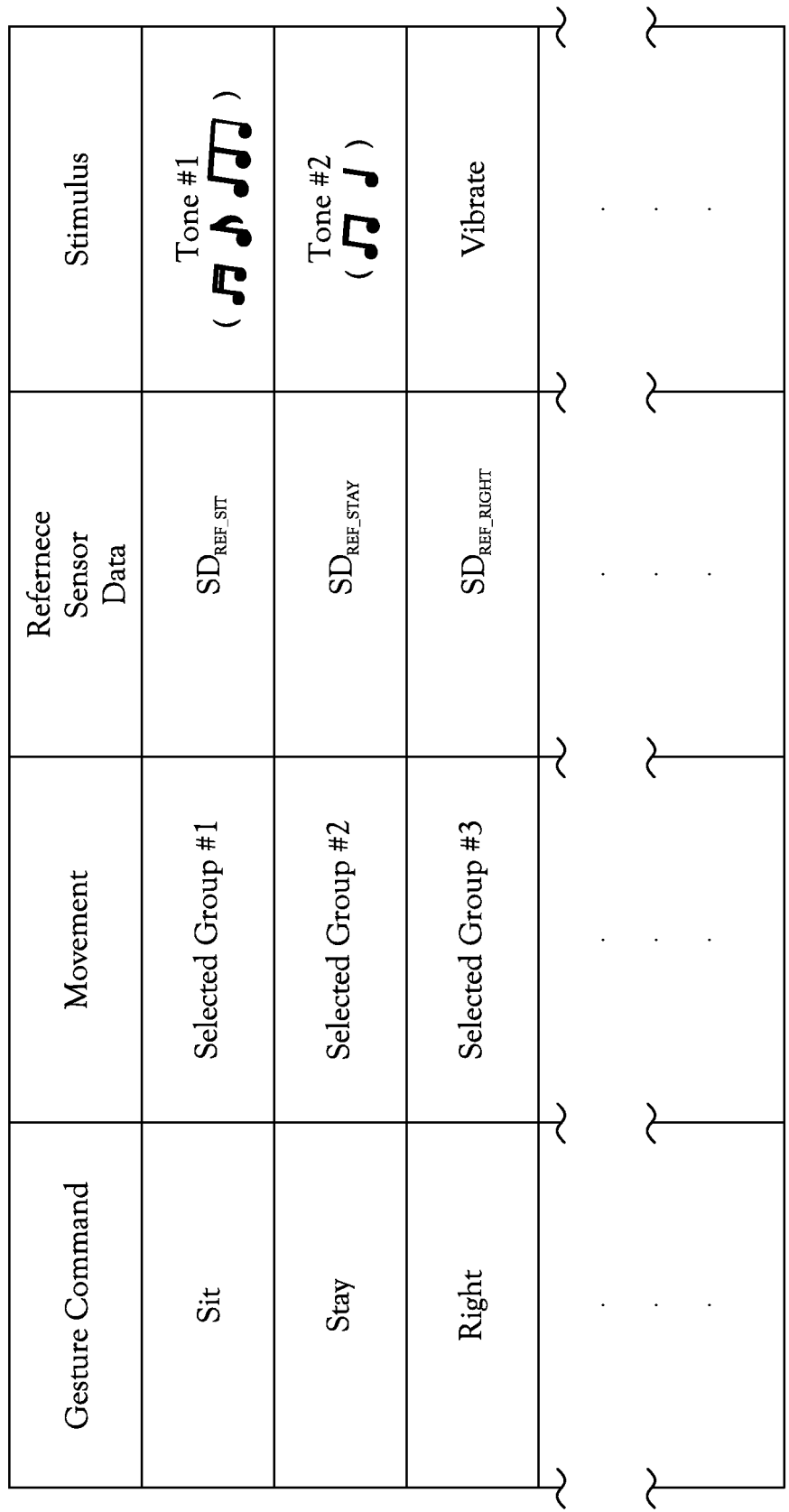
FIG. 3 is one embodiment of a look-up table that provides the association between the gesture command, the groups of movements, sensor data, and the stimulus.

The controller 24 provides the gesture unit 12 with logic control and/or communication with the receiver unit 14. More specifically, the controller 24 communicates information that includes, but is not limited to, sensor data, a particular stimulus, a command signal, or a particular gesture command. In one embodiment, the controller 24 communicates information which is essentially sensor data and relays the sensor data to the receiver unit 14 for determination whether the person has performed a gesture command. In another embodiment, the controller 24 is configured to analyze the movements detected by the motion sensor 18 and determine whether the movements correspond to a known gesture command. More specifically, the controller 24 compares the sensor data for the movements detected by the motion sensor 18 against reference sensor data for each gesture command to determine whether the person has performed a gesture command. For example, FIG. 3 depicts a lookup table that provides the association between the groups of movements, the reference sensor data, the gesture command, and the stimulus. Upon determining the person has performed a gesture command, the controller 24 generates a command signal for transmission to the receiver unit 14. One skilled in the art will appreciate that the controller 24, as used herein, generically refers to a control or processing unit that provides the necessary control and functionality to implement the gesture unit 12.

The controller 24 is in electrical communication with the transmitter 20 to convey the information from the gesture unit 12 to the receiver unit 14. The communication between the gesture unit 12 and the receiver unit 14 is typically achieved through some form of wireless communication. For example, in the embodiment illustrated in FIG. 1, the transmitter 20 is configured for radio frequency (RF) communication with the receiver unit 14. It should also be noted to minimize cross interference with other gesture-based animal trainers 10, wireless communication of the command data between the gesture unit 12 and receiver unit 14 can be realized as a secured data transmission, e.g., an identification code included in the communication.

It should also be noted that the motion sensor 18, the controller 24, and the transmitter 20 can be realized in a single housing or in multiple linked housings. This allows the gesture unit 12 to be configured in an all-inclusive unit or separate units that are configured for compactness, unobtrusiveness, power consumption, or other desired characteristic. In one embodiment of the gesture unit mounted to the person, the motion sensor is configured to be small, unobtrusive, and has minimal power consumption while having a larger powered transmitter for long range communication. For example, as depicted in FIG. 1, the motion sensor 18 is relatively small and is housed in a sensor module carried on an arm band at a remote location from the transmitter 20 housed in a transmitter module carried on the person's belt.

Figure 4:
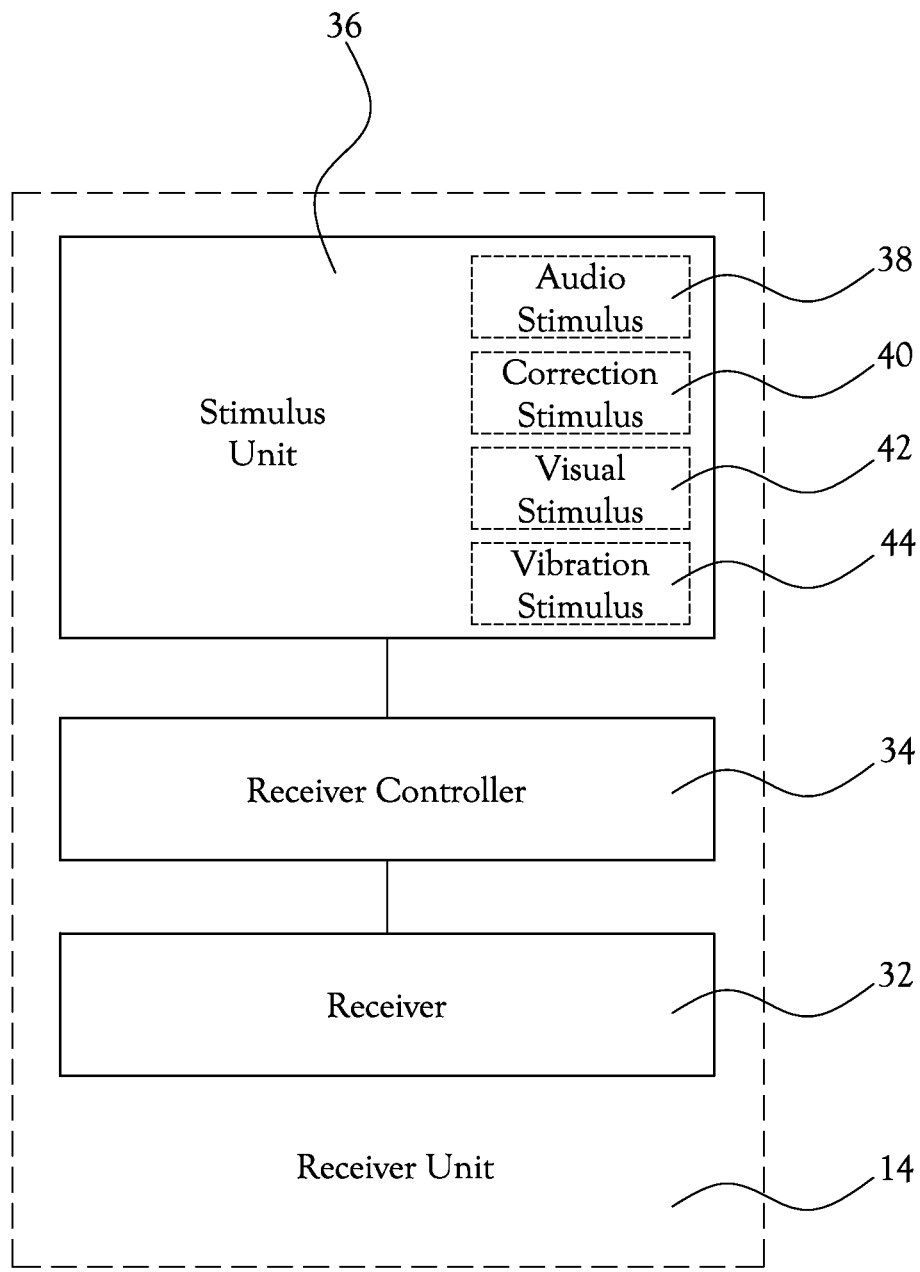
FIG. 4 is a block diagram of one embodiment of the receiver unit of the gesture-based animal trainer.

FIG. 4 illustrates a block diagram of one embodiment of the receiver unit 14 for the gesture-based animal trainer 10. In the illustrated embodiment, the receiver unit 14 includes a receiver 32, a receiver controller 34, and a stimulus unit 36. The receiver controller 34 communicates with the receiver 32 and the stimulus unit 36 such that the receiver unit 14 receives sensor data and/or command signal from the gesture unit 12 and provides a stimulus associated with the gesture command. This stimulus provides the animal with an indication of the gesture command without requiring the animal to visually observe the gesture command.

The receiver 32 provides for communication of the gesture command between the receiver unit 14 and the gesture unit 12. More specifically, the receiver 32 is configured to receive the sensor data and/or command signal transmitted from the gesture unit 12. It should be noted that the receiver 32 and the transmitter 20 should be compatible technologies. For example, in the embodiment illustrated in FIG. 1, the receiver 32 is configured for wireless communication with the gesture unit 12. As discussed earlier, one suitable transmitter for the gesture unit 12 in FIG. 1 is a RF transmitter and accordingly one suitable receiver 32 for the receiver unit 14 in FIG. 1 is a RF receiver.

The receiver controller 34 provides the receiver unit 14 with the logical functions for analyzing the communication from the gesture unit 12 and determining the respective stimulus to provide to the animal. More specifically, the receiver controller 34 analyzes the sensor data and/or command signal received by the receiver 32. In one embodiment, the receiver controller 34 analyzes the command signal that includes a gesture command and determines the stimulus by a lookup chart displaying the gesture command and corresponding stimulus. In another embodiment, the receiver controller 34 analyzes the sensor data by comparing with reference sensor data to determine whether the person has performed a gesture command and the respective stimulus therefore, e.g., the look-up table in FIG. 3. When the receiver controller 34 determines the respective stimulus, the receiver controller 34 communicates the respective stimulus to the stimulus unit 36.

The stimulus unit 36 provides a stimulus to the animal, which serves as a signal to notify the animal that the person has given the particular gesture command. The stimulus is any stimulus intended to motivate the animal, including a rewarding stimulus or a corrective stimulus. More specifically, the stimulus could optionally include an audio stimulus 38, a corrective stimulus 40, a visual stimulus 42, a vibration stimulus 44, and/or other stimulus intended to impact the animal's senses. For example, in the embodiment illustrated in FIG. 1, the receiver unit 14 provides an audible stimulus 16 associated with the 'stay' gesture command. Upon the animal associating the respective stimulus with the gesture command, the gesture-based animal trainer 10 allows the animal to receive the gesture command regardless of whether the person is within the animal's line of sight.

Figure 5:
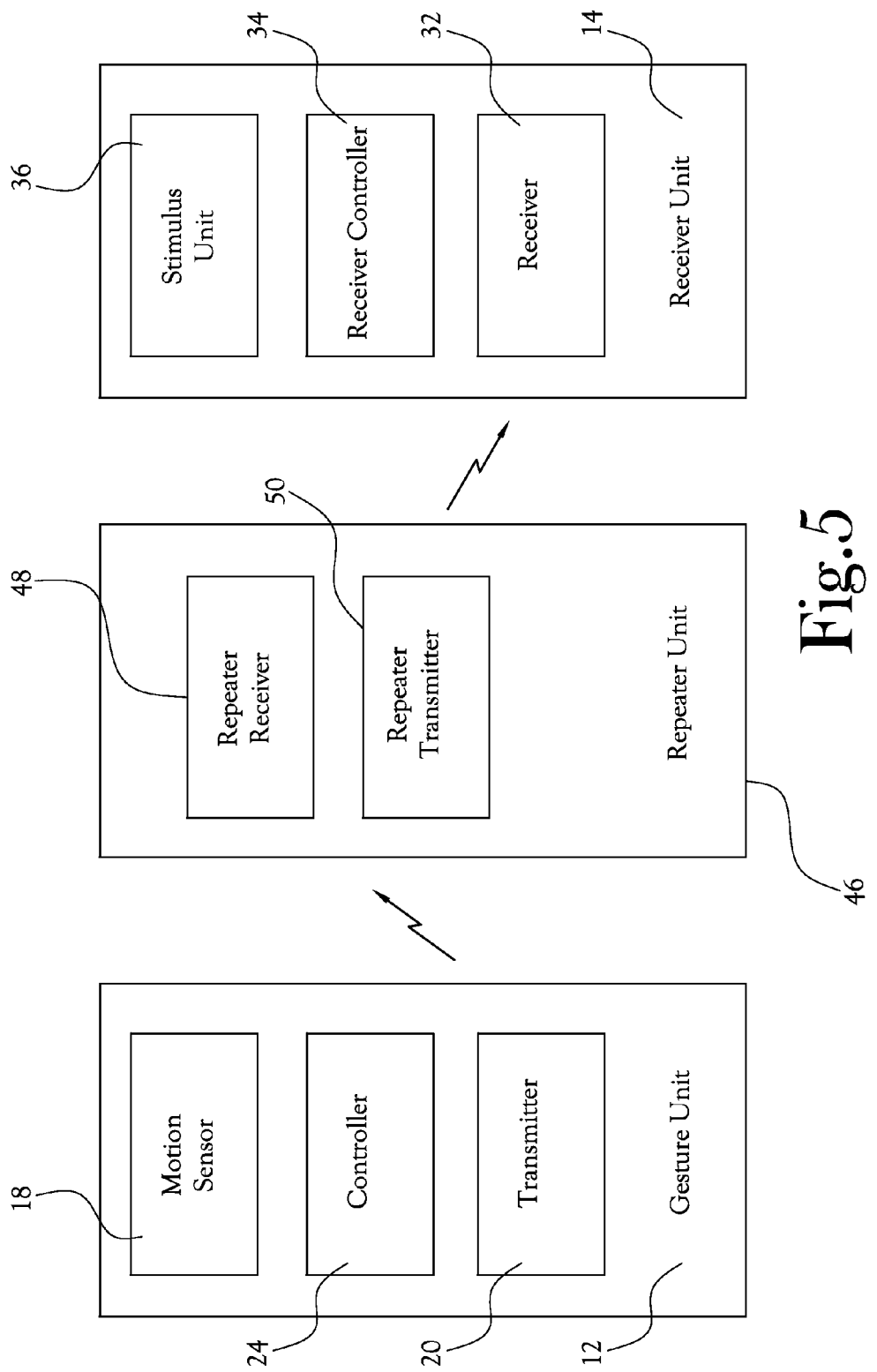
FIG. 5 is a block diagram of an alternate embodiment of the gesture-based animal trainer.

FIG. 5 illustrates a block diagram of an alternate embodiment of the gesture-based animal trainer 10. In the illustrated embodiment, the gesture unit 12 includes a controller 24 in communication with a motion sensor 18 and a transmitter 20. The controller 24 communicates with the motion sensor 18 and transmitter 20 such that the gesture unit 12 is able to translate a person's movements into a command signal which is communicated wirelessly to a repeater unit 46. The repeater unit 46 includes a repeater receiver 48 and a repeater transmitter 50. The repeater unit 46 receives the command signal from the gesture unit 12 and communicates the command signal to the receiver unit 14, which includes a receiver 32, a receiver controller 34, and a stimulus unit 36.

Figure 6:
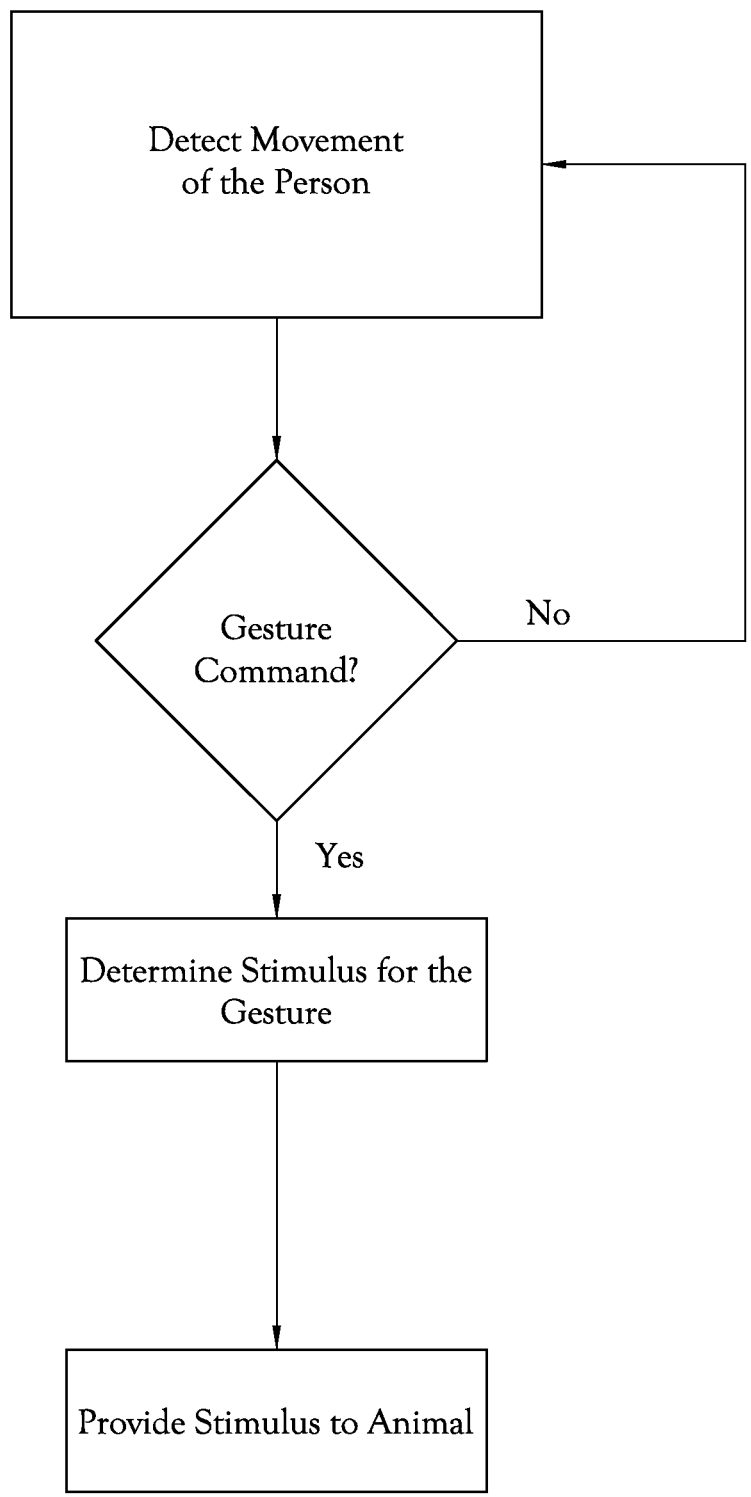
FIG. 6 is a flowchart of one embodiment of a gesture-based animal trainer process by which the gesture-based animal trainer senses a gesture command performed by a person and provides a respective stimulus to the animal.
Figure 7:
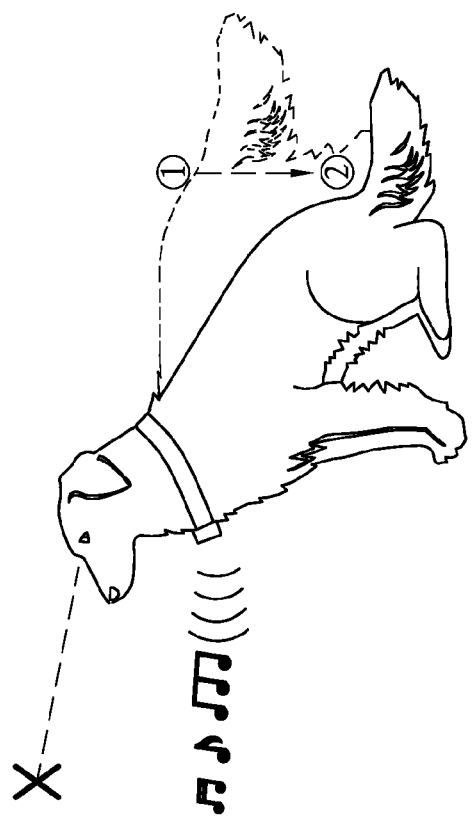
FIG. 7 is a pictorial of the flowchart illustrated in FIG. 5 wherein the gesture-based animal trainer senses the "sit" gesture command and provides a respective stimulus to the animal.
Figure 7:
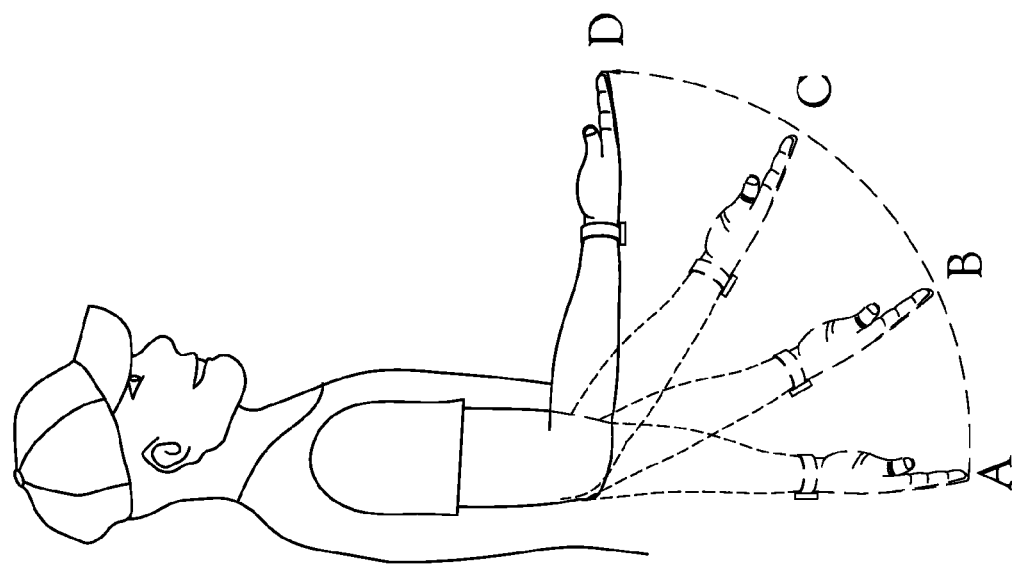

FIGS. 6 and 7 graphically illustrate one embodiment of the process by which the gesture-based animal trainer 10 senses a gesture performed by the person and provides a respective stimulus to notify the animal of the particular gesture command. FIG. 6 illustrates a flowchart showing the process of determining if a person performs a gesture command and providing a respective stimulus therefore. FIG. 7 illustrates a pictorial of the flowchart in FIG. 6 by which the gesture-based animal trainer 10 senses the selected group of movements associated with the "sit" gesture command and provides a respective stimulus to the animal. The gesture-based animal trainer 10 is configured to detect movement of the person from the motion sensor 18. For example, in FIG. 7, the motion sensor 18 detects the person's movements from A-D, namely the movement of the person's arm bending from a starting position at their side with their hand open (A) to a position with their palm upwards (D). The gesture-based animal trainer 10 analyzes the person's movements detected by the motion sensor 18 to determine whether the person performed a gesture command. If the person performed a gesture command, the gesture-based animal trainer 10 determines the stimulus associated with the gesture command, e.g., the lookup table in FIG. 3 showing gesture commands and corresponding stimuli, and provides the animal with the stimulus. In FIG. 7, the gesture-based animal trainer 10 provides the animal with an audible stimulus in response to the "sit" gesture command. Although the animal cannot visually observe the gesture command, the stimulus notifies the animal that the person has given the "sit" gesture command. Accordingly, the animal sits by moving from (1) to (2) in response to the stimulus.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An electronic animal training device for communicating a gesture command given by a person to an animal without requiring the animal to visualize the gesture command being performed by the person, said electronic animal training apparatus comprising:
a motion sensor carried by a person, said motion sensor configured to detect selected movements corresponding to a respective gesture command associated with a respective animal training cue to command the animal to execute a particular behavior, said motion sensor generating sensor data corresponding to the selected movements;
a controller in communication with and responsive to said motion sensor, said controller adapted to analyze said sensor data, said controller generating a command signal identifying a performed gesture command after a determination that said sensor data corresponds to the respective gesture command; and
a stimulus unit in communication with said controller, said stimulus unit receiving said command signal and producing a selected stimulus to the animal identifying the performed gesture command.

2. The electronic animal training device of claim 1 wherein said stimulus unit is configured to produce an audible stimulus associated with the performed gesture command.

3. The electronic animal training device of claim 1 wherein said motion sensor includes at least one of an accelerometer, gyroscope, tilt sensor, or switch.

4. The electronic animal training device of claim 1 comprising a transmitter for communication of said command signal to said stimulus unit.

5. The electronic animal training device of claim 4 further comprising a gesture unit configured for housing said transmitter and said motion sensor and said controller.

6. The electronic animal training device of claim 5 wherein said gesture unit includes a sensor module and a transmitter module, said transmitter module receiving one of said sensor data and said command signal from said sensor module, said transmitter module communicating said command signal to said stimulus unit.

7. The electronic animal training device of claim 1 further comprising a receiver unit configured for housing said stimulus unit and said controller.

8. An electronic animal training device for communicating a gesture command given by a person to an animal without requiring the animal to visualize the gesture command being performed by the person, said electronic animal training apparatus comprising:
a gesture unit carried by a person, said gesture unit producing sensor data in response to selected movements corresponding to a respective gesture command associated with a respective animal training cue to command the animal to execute a particular behavior, said gesture unit analyzing said sensor data to determine whether said sensor data corresponds to a gesture command, said gesture unit generating a command signal identifying a performed gesture command when said sensor data corresponds to the respective gesture command; and
a receiver unit in communication with said gesture unit and responsive to said command signal, said receiver unit providing a selected stimulus to the animal based on said command signal, said selected stimulus identifying the performed gesture command.

9. The electronic animal training device of claim 8 wherein said receiver unit includes an audible stimulus unit configured to produce an audible stimulus associated with the performed gesture.

10. The electronic animal training device of claim 8 wherein said gesture unit includes at least one of an accelerometer, gyroscope, tilt sensor, or switch.

11. The electronic animal training device of claim 8 wherein said gesture unit further comprises a transmitter for communication of said command signal to said receiver unit.

12. The electronic animal training device of claim 11 wherein said gesture, unit includes a sensor module and a transmitter module, said transmitter module receiving one of said sensor data and said command signal from said sensor module, said transmitter module communicating said command signal to said receiver unit.

13. A method for training an animal with an electronic animal training device for communicating a gesture command given by a person to an animal without requiring the animal to visualize the gesture command being performed by the person, said method comprising the steps of:
  (a) providing a gesture unit carried by a person and responsive to movements of the person;
  (b) performing selected movements corresponding to a respective gesture command associated with a respective animal training cue to command the animal to execute a particular behavior;
  (c) providing a receiver unit carried by the animal;
  (d) communicating the respective gesture command to the receiver unit; and
  (e) providing a selected stimulus identifying the respective gesture command to the animal.

14. The method of claim 13 wherein said step of performing selected movements further comprises the step of performing selected movements that define a respective gesture command while the animal visualizes said gesture command such that the animal associates said selected stimulus with said gesture command.

15. The method of claim 13 wherein said step of performing selected movements further comprises the step of performing selected movements that define a respective gesture command while the animal is unable to visualize said gesture command such that the gesture command is communicated to the animal without visually observing said gesture command.

* * * * *